United States Patent
Schumann et al.

(10) Patent No.: US 9,322,451 B2
(45) Date of Patent: Apr. 26, 2016

(54) HYDRAULIC MOUNT APPARATUS FOR SUPPORTING VIBRATION SOURCE

(75) Inventors: Eric Louis Schumann, Tipp City, OH (US); David John Barta, Beavercreek, OH (US); Brent Wade Fourman, New Paris, OH (US)

(73) Assignee: Beijing West Industries Co., Ltd., Beijing (CN)

( * ) Notice: Subject to any disclaimer, the term of this patent is extended or adjusted under 35 U.S.C. 154(b) by 6 days.

(21) Appl. No.: 14/232,511

(22) PCT Filed: Jun. 7, 2012

(86) PCT No.: PCT/CN2012/076593
§ 371 (c)(1),
(2), (4) Date: Apr. 16, 2014

(87) PCT Pub. No.: WO2013/007140
PCT Pub. Date: Jan. 17, 2013

(65) Prior Publication Data
US 2014/0217661 A1    Aug. 7, 2014

Related U.S. Application Data

(60) Provisional application No. 61/506,699, filed on Jul. 12, 2011.

(51) Int. Cl.
*F16F 13/10* (2006.01)
*F16F 13/26* (2006.01)
*F16F 13/30* (2006.01)

(52) U.S. Cl.
CPC ............... *F16F 13/10* (2013.01); *F16F 13/105* (2013.01); *F16F 13/264* (2013.01); *F16F 13/305* (2013.01); *F16F 2224/0283* (2013.01); *F16F 2224/045* (2013.01); *F16F 2230/18* (2013.01)

(58) Field of Classification Search
CPC ....... F16F 13/10; F16F 13/105; F16F 13/264; F16F 13/305; F16F 2224/045; F16F 2230/18; F16F 9/446; F16F 9/537; F16F 9/5126
USPC ..................... 188/267; 267/140.14
See application file for complete search history.

(56) References Cited

U.S. PATENT DOCUMENTS

| 4,660,812 A * | 4/1987 | Dan | F16F 13/26 |
| | | | 267/140.13 |
| 4,877,225 A * | 10/1989 | Noguchi | F16F 13/262 |
| | | | 267/140.14 |

(Continued)

FOREIGN PATENT DOCUMENTS

| CN | 101657651 | 2/2010 |
| CN | 101657651 A | 2/2010 |

(Continued)

OTHER PUBLICATIONS

International Search Report, Aug. 23, 2012, three pages.

(Continued)

*Primary Examiner* — Robert A Siconolfi
*Assistant Examiner* — San Aung
(74) *Attorney, Agent, or Firm* — Dickinson Wright PLLC

(57) ABSTRACT

A hydraulic mount apparatus (20) for supporting a vibration source is disclosed. The mount apparatus (20) includes a housing (22) that defines a housing chamber (24) separated by a partition assembly (62) into a pumping chamber (64) and a receiving chamber (66), each containing a magnetorheological fluid (68). A flexible body (48) is partially disposed in the pumping chamber (64) for deforming elastically in response to vibrations caused by an external excitation. A fluid passage (106) extends between the pumping chamber (64) and the receiving chamber (66) for passing the fluid therebetween during low frequency vibrations. A piezostack actuator (118) partially extends into the pumping chamber (64) for moving within the pumping chamber (64) for varying the volume of the pumping chamber (64) to prevent a pressure increase in the pressure chamber to substantially cancel relatively high frequency vibrations.

13 Claims, 1 Drawing Sheet

(56) References Cited

U.S. PATENT DOCUMENTS

| | | | |
|---|---|---|---|
| 5,344,129 A | 9/1994 | Ide et al. | |
| 5,356,123 A | 10/1994 | Hamada et al. | |
| 5,439,204 A * | 8/1995 | Yamazoe | H02K 33/18 267/140.14 |
| 5,601,280 A * | 2/1997 | Nagaya | F16F 13/26 267/140.14 |
| 5,653,427 A * | 8/1997 | Matsuda | F16F 13/26 267/140.14 |
| 6,044,939 A | 4/2000 | Forster | |
| 6,622,995 B2 | 9/2003 | Baudendistel et al. | |
| 2003/0037997 A1 | 2/2003 | Sakata | |
| 2005/0056981 A1* | 3/2005 | Nemoto | F16F 13/264 267/140.13 |
| 2005/0236750 A1* | 10/2005 | Freudenberg | F16F 13/262 267/140.11 |
| 2010/0301530 A1* | 12/2010 | Koyama | F16F 13/268 267/140.14 |
| 2011/0139557 A1 | 6/2011 | Mangelschots et al. | |

FOREIGN PATENT DOCUMENTS

| | | |
|---|---|---|
| CN | 101936360 | 1/2011 |
| CN | 101936360 A | 1/2011 |
| DE | 102006051605 A1 | 5/2008 |
| EP | 2159444 | 3/2010 |
| EP | 2159444 A1 | 3/2010 |
| JP | 63210428 | 2/1983 |
| JP | 63210428 A | 9/1988 |
| JP | 02240428 A | 9/1990 |
| JP | 04341629 A | 11/1992 |
| JP | 05164181 A | 6/1993 |
| JP | 06185568 A | 7/1994 |
| JP | 07224885 A | 8/1995 |
| JP | 2003065384 A | 3/2003 |

OTHER PUBLICATIONS

Supplementary European Search Report; Dated Feb. 10, 2016; 9 Pages.

* cited by examiner

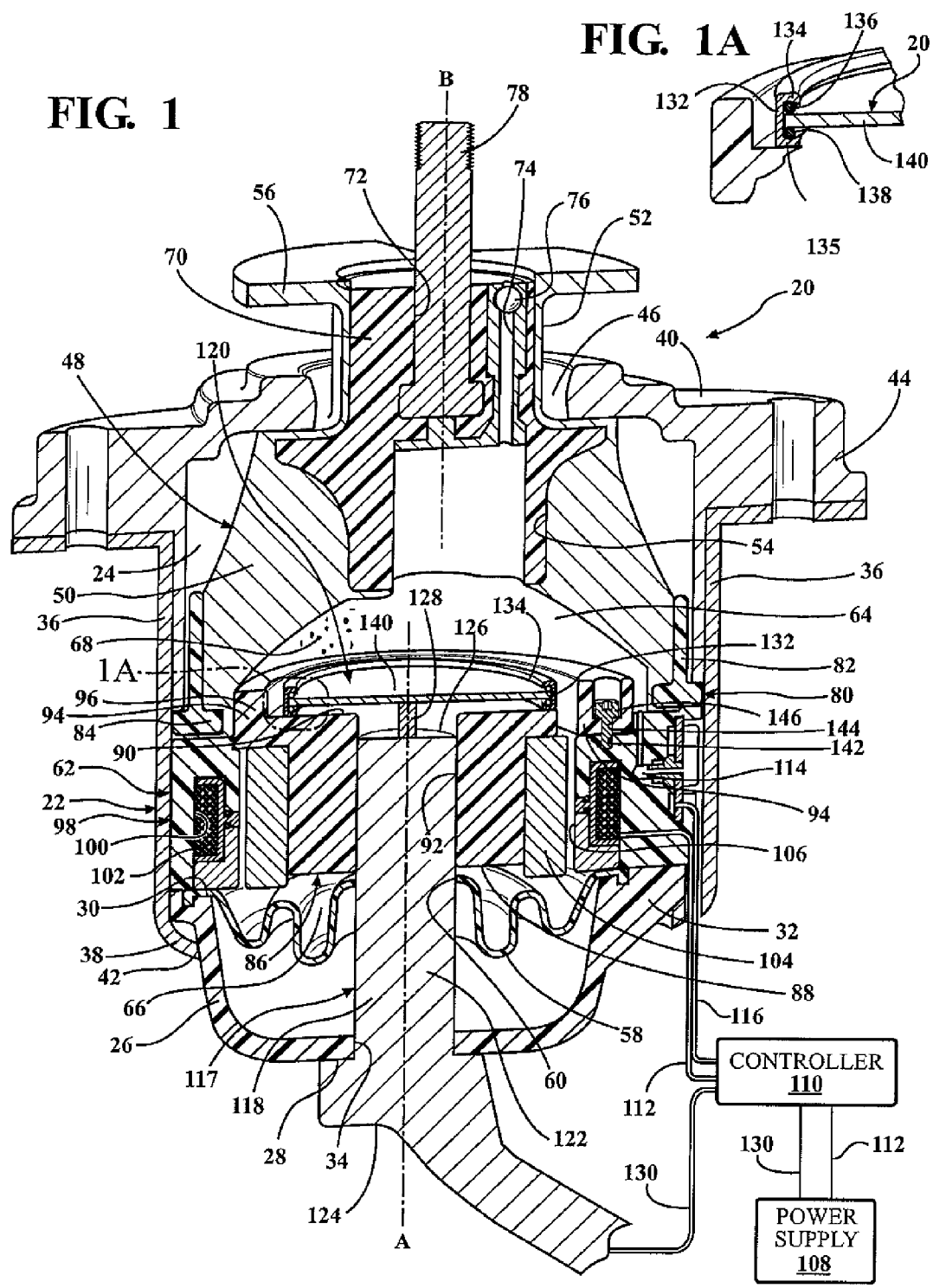

HYDRAULIC MOUNT APPARATUS FOR SUPPORTING VIBRATION SOURCE

BACKGROUND OF THE INVENTION

1. Field of the Invention

A hydraulic mount apparatus for supporting a vibration source.

2. Description of the Prior Art

Conventional hydraulic mounts exist for supporting and providing vibration isolation of vibration sources. One well known application of these mounts is for supporting components of automotive vehicles. These mounts typically operate to provide engine vibration isolation while also controlling the motion of the engine and connected powertrain components with respect to the vehicle frame or body structure. In many applications of engine and powertrain mounts, it is desirable to vary damping characteristics of the mount to provide selective isolation of vibrations at certain frequencies. At the same time, it is necessary to provide the mount with a relatively high dynamic stiffness to control large displacements of the powertrain with respect to the vehicle body structure.

Magnetorheological fluid-based vibration damping mounts have been developed to isolate or dampen vibrations at multiple frequencies. Magnetorheological fluid, as known in the art, is responsive to a magnetic field to modify its shear properties. Specifically, it has the ability to reversibly change from a free-flowing, linear, viscous liquid to a semi-solid with controllable yield strength when exposed to a magnetic field. These magnetorheological fluid-based dampers use this characteristic of the fluid to control the spring and damper rates when required.

One such magnetorheological fluid based mount is disclosed in U.S. Pat. No. 6,622,995 to Baudendistel et al. The mount includes a housing that extends about and along a first axis and defines a housing chamber. A flexible body made of an elastic material is disposed in the housing chamber and extends radially about and along the first axis for deforming elastically in response to movement of a vibration source (i.e. engine of an automotive vehicle) relative to a base (i.e. frame of the automotive vehicle). Further, a diaphragm made of an elastic material is disposed in the housing chamber and spaced axially from the flexible body. A partition assembly is disposed in the housing chamber between the flexible body and the diaphragm for dividing the housing chamber into a pumping chamber between the flexible body and the partition assembly, and a receiving chamber between the partition assembly and the diaphragm. The volume of each of these chambers is changed by deformation of the flexible body and the diaphragm in response to an external excitation. A sensor is disposed on the automotive vehicle for measuring a vibration condition of the automotive vehicle in response to the external excitation and producing a corresponding signal. Magnetorheological fluid is contained within the pumping and receiving chambers. The partition assembly defines a fluid passage that extends axially between the pumping chamber and the receiving chamber to fluidly connect the pumping chamber and the receiving chamber for passing the fluid between the pumping and receiving chambers in response to deformation of the flexible body and the diaphragm. The partition assembly includes an electromagnet coil disposed adjacent to the fluid passage for variably generating a magnetic flux across the fluid passage for modifying the shear resistance of the magnetorheological fluid passing through the fluid passage to variably change the damping stiffness of the mount in response to the signal from the sensor.

A common shortcoming of magnetorheological fluid-based mounts is that their vibration isolating capabilities are limited to isolating vibrations at relatively low frequencies, typically less than approximately 20 Hz, because the magnetorheological fluid is unable to pass through the fluid passage at higher frequencies.

In order to combat this shortcoming, a hybrid mount disclosed in Young-Min Han et al., *Design and control of a hybrid mount featuring a magnetorheological fluid and a piezostack*, 20 Smart Mater. Struct. 075019 (2011), was developed to reduce vibrations in a larger frequency range. The hybrid mount includes a magnetorheological fluid damping system to reduce vibrations at relatively low frequencies, and a piezostack actuator that excites a secondary inertial mass such that the inertial forces of the secondary mass substantially cancel the forces from the external excitation to cancel relatively high frequency vibrations. However, a downside to this system is that the secondary mass and piezostack actuator have to be sized properly in order to cancel the forces from the external excitation, resulting in the addition of undesirable extra mass to the system.

SUMMARY OF THE INVENTION

The subject invention provides for such a hydraulic mount apparatus wherein an actuator assembly including an actuator at least partially of a piezoelectric material extends at least partially into the pumping chamber for moving within the pumping chamber for varying the volume of the pumping chamber to prevent a pressure increase in the pumping chamber to cancel the external excitation when the measured vibratory frequency is at high frequencies.

Thus several advantages of one or more aspects of the invention are that the hydraulic mount apparatus is able to substantially cancel vibrations at relatively low frequencies through the magnetorheological fluid-based damping components as well as high frequencies through the actuator and moving member while minimizing the mass of the apparatus since a secondary mass and piezostack actuator do not need to be sized relative to external excitations. Accordingly, the invention provides for an inexpensive, simple design that provides for the cancellation of external excitation at a wide range of frequencies.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 1 is cross-section view of the hydraulic mount apparatus and a schematic of the control system and power supply; and FIG. 1A is a sectional view of the plunger support ring, plunger member, plunger O-rings, and lower support member.

DETAILED DESCRIPTION OF THE ENABLING EMBODIMENTS

Referring to the Figures, wherein like numerals indicate corresponding parts throughout the several views, a hydraulic mount apparatus 20 is generally shown for supporting a vibration source on a base. In the enabling embodiment the hydraulic mount apparatus 20 is used for supporting a component on the frame of an automotive vehicle. However, it should be appreciated that the mount could be used for supporting various other vibration sources on a base.

The hydraulic mount apparatus 20 includes a housing 22 that defines a housing chamber 24. The housing 22 includes a generally bowl-shaped lower housing portion 26 that extends about and along a first axis A from a closed lower housing portion lower end 28 to an open lower housing portion upper end 30. The lower housing portion 26 defines a lower housing portion lip 32 that extends radially outwardly from the lower housing portion upper end 30. The lower housing portion 26 also defines a lower housing bore 34 along the first axis A.

The housing 22 further includes a generally cup-shaped upper housing portion 36 that is disposed generally axially above the lower housing portion 26 and extends about and along a second axis B parallel to the first axis A from an open upper housing portion lower end 38 to a closed upper housing portion upper end 40. It should be appreciated that the lower and upper housing portions 26, 36 could each have other shapes (e.g. square shaped cross-sections). The upper housing portion lower end 38 defines an upper housing portion lower lip 42 that extends radially inwardly from the upper housing portion lower end 38 and is disposed below and cooperates with the lower housing portion lip 32 to restrict relative axial movement between the upper housing portion 36 and the lower housing portion 26. The upper housing portion upper end 40 defines a mounting flange 44 that extends radially outwardly therefrom for attachment with the base. In the enabling embodiment, the mounting flange 44 attaches to the frame of the automotive vehicle. However, it could attach to any base. The upper housing portion upper end 40 further defines an upper housing bore 46 that extends therethrough along the second axis B. It should be appreciated that the upper housing portion 36 and the lower housing portion 26 define the housing chamber 24 together therein.

The hydraulic mount apparatus 20 further includes a flexible body 48 made of an elastic material that extends radially about and axially along the second axis B from a generally frusto-conical shaped flexible body lower portion 50 disposed in the housing chamber 24, through the upper housing bore 46, to a flexible body upper portion 52 outside of the housing chamber 24. The flexible body 48 deforms elastically in response to movement of the vibration source relative to the base due to an external excitation (e.g. piston vibrations, engine rocking, road vibrations). The flexible body 48 defines a flexible body passage 54 that extends therethrough along the second axis B. The flexible body upper portion 52 defines a flexible body flange 56 that extends radially outwardly therefrom for engaging the closed upper housing portion upper end 40 when the flexible body 48 deforms past a predetermined length. In other words, the flexible body flange 56 prevents the flexible body lower portion 50 from flexing past the point in which the flexible body flange 56 engages the closed upper housing 22 upper end.

A generally circular-shaped diaphragm 58 made of an elastic material is sealingly disposed in the housing chamber 24 below the flexible body 48. The diaphragm 58 defines a diaphragm opening 60 along the first axis A. It should be appreciated that the diaphragm 58 could have other shapes, so long as they conform to the shape of the housing 22.

A partition assembly 62 is disposed in the housing chamber 24 between the flexible body 48 and the diaphragm 58. Specifically, the partition assembly 62 extends radially about and axially along the first axis A to divide the housing chamber 24 into a pumping chamber 64 between the flexible body 48 and the partition assembly 62 and a receiving chamber 66 between the partition assembly 62 and the diaphragm 58. The volume of each of the chambers 64, 66 is changed by deformation of the flexible body 48 and the diaphragm 58 in response to the external excitations. A magnetorheological fluid 68 is contained within the pumping and receiving chambers 64, 66. Magnetorheological fluid 68, as known in the art, is responsive to a magnetic field to modify its shear properties. Specifically, it has the ability to reversibly change from a free-flowing, linear, viscous liquid to a semi-solid with controllable yield strength when exposed to a magnetic field.

A metal upper support member 70 that has a shape in conformance with the flexible body passage 54 is disposed in the flexible body passage 54 in engagement with and bonded to the flexible body 48 adjacent the flexible body upper portion 52. The metal upper support member 70 limits radially inward movement of the flexible body 48. The upper support member 70 defines an upper support member passage 72 that extends therethrough along the second axis B to the pumping chamber 64. The upper support member 70 further defines a fill passage 74 that extends axially therethrough to the pumping chamber 64 and spaced radially outward from the second axis B for receiving the magnetorheological fluid 68. A sealing ball 76 is disposed in the fill passage 74 for sealing the passage in response to the chambers 64, 66 being filled with the magnetorheological fluid 68. It should be appreciated that the upper support member 70 could be made out of various high strength materials.

A generally cylindrical shaped and threaded first mounting member 78 is fixedly disposed in the upper support member passage 72 and extends along the second axis B away from the upper support member 70. The first mounting member 78 threadedly engages the vibration source for interconnecting the vibration source and the mount apparatus 20. In the enabling embodiment, the first mounting member 78 engages the component of the automotive vehicle. However, it should be appreciated that the first mounting member 78 could engage any vibration source. Further, it should be appreciated that the first mounting member 78 could be interconnected with the vibration source in other ways (e.g. bolts or welding).

A metal reinforcing member 80 that has a generally T-shaped cross section is disposed in the housing chamber 24 radially about the second axis B. The reinforcing member 80 defines a vertical reinforcing member portion 82 disposed radially between the upper housing portion 36 and bonded to the flexible body 48 adjacent the flexible body lower portion 50 for restricting movement of the flexible body lower portion 50 radially outwardly. Further, the reinforcing member 80 defines a horizontal reinforcing member portion 84 axially below the flexible body 48 for restricting movement of the flexible body lower portion 50 axially toward the reinforcing member 80. It should be appreciated that the reinforcing member 80 could be made of other high strength materials.

The partition assembly 62 further includes a generally cylindrical shaped metal lower support member 86 that extends radially about and along the first axis A from a lower support member lower end 88 to a lower support member upper end 90. The lower support member 86 defines a partition bore 92 that extends therethrough along the first axis A. The lower support member 86 further defines a lower support member flange 94 that extends radially away from the lower support member upper end 90 and has a generally L-shaped cross section defining a lower support member flange vertical portion 96 that extends axially toward the flexible body 48 into the pumping chamber 64. It should be appreciated that the flexible body 48, upper support member 70 and the lower support member 86 substantially define the pumping chamber 64 therebetween.

The partition assembly 62 further includes a generally cylindrical shaped metal electromagnet support ring 98 disposed radially between the lower support member 86 and the upper housing portion 36 and axially between the reinforcing member 80 and the lower housing portion lip 32. The electromagnet support ring 98 defines a groove 100 that extends radially thereabout. At least one electromagnet coil 102 is disposed in the groove 100 of the electromagnet support ring 98 for selectively generating a magnetic flux. The edge of the diaphragm 58 is sealingly sandwiched axially between the electromagnet support ring 98 and the lower housing portion lip 32. Further the partition assembly 62 includes a flux ring 104 disposed radially between the lower support member 86 and the electromagnet support ring 98 and axially between the lower support member flange 94 and the diaphragm 58. The flux ring 104 is made of a material that has a high magnetic permeability for concentrating a magnetic flux. It should be appreciated that any number of grooves 100 and corresponding electromagnet coils 102 could be disposed at various locations on the electromagnet support ring 98. Further it should be appreciated that more than one flux ring 104 could be used.

The partition assembly 62 further defines at least one fluid passage 106 that extends axially between the pumping chamber 64 and the receiving chamber 66 through the lower support member flange 94 and radially between the flux ring 104, the lower support member flange 94 and the electromagnet support ring 98 for passing the magnetorheological fluid 68 between the pumping and receiving chambers 64, 66 in response to deformation of the flexible body 48 and the diaphragm 58. To variably dampen vibrations at relatively low frequencies, typically at and less than approximately 20 Hz, such as those caused by road vibrations, the at least one electromagnet coil 102 disposed in the groove 100 of the support member selectively generates a magnetic flux across the flux ring 104 and fluid passage 106 for increasing the viscosity of the magnetorheological fluid 68 to increase the shear resistance of the magnetorheological fluid 68 in the fluid passage 106, thereby variably increasing the damping stiffness of the mount. In other words, by means of the magnetorheological damping components, the hydraulic mount apparatus 20 is adapted to isolate or dampen vibrations at multiple low frequencies to optimize the ride, comfort and handling characteristics of the automotive vehicle.

The hydraulic mount apparatus 20 further includes a power supply 108 for supplying power to the mount apparatus 20 and a controller 110 for controlling the magnetic flux generated by the at least one electromagnet coil 102. A plurality of electromagnet wires 112 extend through the upper housing portion 36 between the controller 110, the at least one electromagnet coil 102 and the power supply 108 for electrically connecting the electromagnet coil 102, the controller 110 and the power supply 108. Additionally, at least one sensor 114 extends into the pumping chamber 64 for measuring the pressure change in the chamber in response to the deformation of the flexible body 48 as a result of the external excitation. The sensor 114 generates a signal that corresponds with the vibratory frequency of the component. It should be appreciated that more than one sensor 114 could be used, and the sensor(s) 114 could be placed at various locations on the vibration source, hydraulic mount apparatus 20 or base for measuring various vibration conditions of the vibration source such as displacement, velocity, or acceleration to produce signals that correspond with the vibratory frequency of the vibration source. A plurality of sensor wires 116 extend from the controller 110 to the at least one sensor 114 for electrically connecting the controller 110 and the sensor(s) 114.

The controller 110 defines an electromagnet active operating state for applying a variable positive current through the at least one electromagnet coil 102 for inducing the magnetic flux across the flux ring 104 and fluid passage 106 for increasing the viscosity of the magnetorheological fluid 68 in the fluid passage 106. Additionally, the controller 110 defines an electromagnet inactive operating state in which no current is applied across the fluid passage 106 such that the magnetorheological fluid 68 passes through the fluid passage 106 without its viscosity changed. The controller 110 activates the electromagnet active and inactive operating states in response to the signal from the at least one sensor 114 when the measured vibratory frequency is at the aforementioned relatively low frequencies.

When external excitations cause vibrations to occur at relatively high frequencies, typically above approximately 20 Hz such as during acceleration of the automotive vehicle, fluid is substantially no longer able to flow through the fluid passage 106. To dampen these relatively high frequency vibrations, the hydraulic mount apparatus 20 includes an actuator assembly 117 including an actuator 118 at least partially of a piezoelectric material that engages a moving member 120 at least partially disposed in the pumping chamber 64 for axially moving within pumping chamber 64 for substantially maintaining the volume of the pumping chamber 64 during deformation of the flexible body 48. Maintaining the volume in the pumping chamber 64 prevents a pressure increase in the pumping chamber 64, thereby substantially reducing the rate of transmission of vibrations therethrough. Actuators that include piezoelectric materials, as known in the art, utilize the deformation of electro-active PZT-ceramics upon exposure to electrical fields. These actuators generally have a high force capability and respond predictably at frequencies above 1000 Hz. Therefore, high frequency vibrations can be substantially cancelled.

In the enabling embodiment, the actuator 118 is a piezostack actuator 118. Piazeostack actuators 118, as known in the art, utilize stacks of PZT-ceramics, through which an electric current is applied. The thickness of the ceramics increases in the direction of the applied electrical field. The piezostack actuator 118 includes a cylindrical-shaped actuator casing 122 that extends along the first axis A from an actuator casing lower end 124 disposed outside of the housing 22, through the lower housing bore 34 and the diaphragm opening 60, and to an actuator casing upper end 126 at least partially extending through the partition bore 92. The diaphragm 58 sealingly engages the actuator casing 122 at the diaphragm opening 60 for preventing fluid from flowing from the receiving chamber 66 through the diaphragm opening 60. In the enabling embodiment, the stack of ceramics (not shown) is contained within the actuator casing 122 and engage an actuator piston 128 that slideably extends from inside the actuator casing 122, away from the actuator casing upper end 126 and fixedly engages the moving member 120 for the axial movement of the moving member 120 along the first axis A. The actuator assembly 117 further includes a plurality of actuator wires 130 that extend between the controller 110, the actuator 118 and the power supply 108 for electrically connecting the actuator 118, the controller 110 and the power supply 108. It should be appreciated that the actuator casing 122 could have other shapes (e.g. square cross section).

In the enabling embodiment, the partition assembly 62 includes a cylindrical shaped metal plunger support ring 132 disposed axially above the lower support member upper end 90, concentric with the partition bore 92 and radially inwardly from the lower support member flange 94. The plunger support ring 132 defines a plunger support ring upper flange 134 and a plunger support ring lower flange 135 that each extend radially inwardly therefrom. An upper plunger O-ring 136 is disposed axially below and in engagement with the plunger support ring upper flange 134. Further, a lower plunger O-ring 138 is disposed axially below the upper plunger O-ring 136 and in engagement with the plunger support ring lower flange 135. Additionally, in the enabling embodiment, the moving member 120 is a metal disc shaped plunger member 140 that is disposed radially inwardly from the plunger support ring 132 and axially between and in sealing engagement with the upper and lower plunger O-rings 136, 138 for flexing the O-rings 136, 138 during axial movement of the plunger member 140. It should be appreciated that each O-ring 136, 138 acts as a spring to bias the plunger member 140 down after movement thereof. It should also be appreciated that the lower plunger O-ring 138 could directly engage the lower support member upper end 90 without a plunger support ring lower flange 135 present. It should further be appreciated that the moving member 120 could have other shapes and could be made out of other materials. For example, the moving member 120 could be a flexible membrane with an edge that sealingly engages the plunger support ring 132 with or without the use of O-rings 136, 138.

The controller 110 further controls the movement of the actuator piston 128. The controller 110 defines an actuator compressed operating state for axially moving the actuator piston 128 and plunger member 140 against the plunger upper O-ring into the pumping chamber 64 for decreasing the volume of the pumping chamber 64 to increase the damping stiffness of the mount. Further, the controller 110 defines an actuator rebounded operating state for moving the actuator piston 128 and plunger member 140 axially away from the pumping chamber 64 for increasing the volume of the pumping chamber 64 to decrease the damping stiffness of the mount and to prevent a pressure increase from occurring in response to deformation of the flexible body 48. The controller 110 variably activates the actuator compressed and rebounded states in response to the signal from the at least one sensor 114 and activates the actuator compressed and rebounded states 180 degrees out of phase with the vibratory frequency of the vibration source and equal in magnitude to the vibratory magnitude to effectively maintain the volume in the pumping chamber 64. Therefore, high frequency vibrations caused by the external excitation are substantially cancelled.

The lower support member 86 defines at least one lower support member securing passage 144 that extends axially though the lower support member flange 94. The electromagnet support ring 98 defines at least one electromagnet support ring securing passage 142 that extends thereinto and is in alignment with the at least one lower support member securing passage 144. A fastener 146 threadedly extends through the securing passages 142, 144 of the lower support member 86 and the electromagnet support ring 98 for interconnecting the lower support member 86 and the electromagnet support ring 98.

Obviously, many modifications and variations of the present invention are possible in light of the above teachings and may be practiced otherwise than as specifically described while within the scope of the appended claims. These antecedent recitations should be interpreted to cover any combination in which the inventive novelty exercises its utility. The use of the word "said" in the apparatus claims refers to an antecedent that is a positive recitation meant to be included in the coverage of the claims whereas the word "the" precedes a word not meant to be included in the coverage of the claims.

What is claimed is:
1. A hydraulic mount apparatus for supporting a vibration source on a base comprising;
  a housing extending about and along a first axis and defining a housing chamber,
  a flexible body made of an elastic material at least partially disposed in said housing chamber extending radially about and along said first axis for deforming elastically in response to movement of the vibration source relative to the base,
  a diaphragm made of an elastic material disposed in said housing chamber and spaced axially from said flexible body,
  a partition assembly disposed in said housing chamber between said flexible body and said diaphragm for dividing said housing chamber into a pumping chamber between said flexible body and said partition assembly and a receiving chamber between said partition assembly and said diaphragm with the volume of each of said chambers being changed by deformation of said flexible body and said diaphragm in response to an external excitation,
  at least one sensor disposed on at least one of the hydraulic mount apparatus and the vibration source and the base for measuring a vibration condition of the vibration source in response to the external excitation and producing a corresponding signal,
  a fluid contained within said pumping and receiving chambers and being responsive to a magnetic field to modify its shear properties,
  said partition assembly defining a fluid passage extending axially between said pumping chamber and said receiving chamber to fluidly connect said pumping chamber and said receiving chamber for passing said fluid between said upper and receiving chambers in response to deformation of said flexible body and said diaphragm, said partition assembly including at least one electromagnet coil disposed adjacent to said fluid passage for variably generating a magnetic flux across said fluid passage for modifying the shear resistance of said fluid passing through said fluid passage to variably change the damping stiffness of said mount in response to said signal from said sensor when the measured vibratory frequency is at low frequencies,
  an actuator assembly including an actuator at least partially of a piezoelectric material extending at least partially into said pumping chamber for moving within said pumping chamber for varying the volume of said pumping chamber to prevent a pressure increase in said pressure chamber to cancel the external excitation when the measured vibratory frequency is at high frequencies,
  said partition assembly defining a partition bore extending between said pumping and receiving chambers and said actuator extending from outside of said housing into said housing chamber and at least partially through said partition bore,
  said actuator assembly further including a moving member operatively engaging said actuator for axially moving with said actuator within said pumping chamber for varying the volume of said pumping chamber,
  wherein said moving member comprises a plunger member having a generally disc shape,
  said actuator further including an actuator casing and an actuator piston slideably extending from inside said actuator casing and in engagement with said moving member, and said partition assembly further including a plunger support ring disposed radially about and spaced from said partition bore and the edge of said plunger member sealingly engages said plunger support ring to seal said partition bore.

2. An apparatus as set forth in claim 1 wherein said plunger support ring defines a plunger support ring flange extending radially inwardly therefrom and an upper plunger O-ring is disposed axially below and in engagement with said plunger support ring flange and a lower plunger O-ring is disposed axially below said upper plunger O-ring and said plunger member is disposed axially between and in sealing engagement with said upper and lower plunger O-rings for flexing said O-rings during said axial movement of said plunger member.

3. An apparatus as set forth in claim 2 wherein said plunger support ring defines a plunger support ring upper flange and a plunger support ring lower flange axially below said plunger support ring upper flange and said upper plunger O-ring is in engagement with said plunger support ring upper flange and said lower plunger O-ring is in engagement with said plunger support ring lower flange.

4. An apparatus as set forth in claim 3 and further including a controller for controlling the movement of said actuator piston and said plunger member actuator assembly and said controller moves said actuator piston 180 degrees out of phase with the frequency of the vibratory condition of the vibration source and equal in magnitude to the vibratory condition to cancel the external excitation when said measured vibratory condition is at high frequencies.

5. An apparatus as set forth in claim 3 wherein said partition assembly includes a lower support member having a generally cylindrical shape and extending axially from a lower support member lower end at said receiving chamber to a lower support member upper end at least partially engaging said plunger support ring and said lower support member defines said partition bore.

6. An apparatus as set forth in claim 5 wherein said lower support member defines a lower support member flange extending radially away from said lower support member upper end and having a generally L-shaped cross section including a lower support member flange vertical portion extending axially into said pumping chamber adjacent said plunger support ring.

7. An apparatus as set forth in claim 6 wherein said lower support member flange defines a lower support member securing passage extending axially therethrough.

8. An apparatus as set forth in claim 7 wherein said partition assembly further includes an electromagnet support ring having a generally cylindrical shape and disposed radially between said lower support member and said housing and axially between said pumping and receiving chambers.

9. An apparatus as set forth in claim 8 wherein said electromagnet support ring defines a groove extending radially thereabout and said at least one electromagnet coil is disposed in said groove.

10. An apparatus as set forth in claim 9 wherein said electromagnet support ring defines at least one electromagnet support ring securing passage extending axially therethrough and in alignment with said at least one lower support member securing passage.

11. An apparatus as set forth in claim 10 wherein a fastener extends through said securing passages of said lower support member and said electromagnet support ring for interconnecting said lower support member and said electromagnet support ring.

12. An apparatus as set forth in claim 1 wherein said actuator is of the piezoelectric stack type.

13. An apparatus as set forth in claim 1 wherein the vibration source is a component of an automotive vehicle and the base is the frame of the automotive vehicle.

* * * * *